June 12, 1956 M. E. LATHAM 2,750,320

PROCESS FOR PREPARING CONTINUOUS PLASTIC SHEETS

Filed March 29, 1954 2 Sheets-Sheet 1

MORTON ELBER LATHAM
INVENTOR.

BY Robert M. McManigal
Attorney

MORTON ELBER LATHAM
INVENTOR.

BY Robert M. McManigal
Attorney

United States Patent Office 2,750,320

Patented June 12, 1956

2,750,320

PROCESS FOR PREPARING CONTINUOUS PLASTIC SHEETS

Morton Elber Latham, Alhambra, Calif., assignor to Swedlow Plastics Company, Los Angeles County, Calif., a corporation of California Application March 29, 1954, Serial No. 419,245

12 Claims. (Cl. 154—126)

This invention relates to continuous polymerization of a polymerizable monomeric material induced by activating light to provide a continuous translucent sheet either with or without a filler material.

Photo-induction of additive polymerization has long been generally recognized but has been used to induce polymerization in batch lots only.

An object of this invention is to provide a process whereby continuous controlled polymerization of ethylenically unsaturated organic monomeric materials can be effected to provide continuous translucent sheets either with or without filler material. By translucent I include transparent and am using the word translucent in that broad sense in both the specification and the claims. This may be accomplished using any translucent polymerizable ethylenically unsaturated material in conjunction with an acyloin of the general configuration R—CO—CHOH—$R^1$ where R and $R^1$ are monovalent hydrocarbon radicals, and an organic peroxide, carrying the polymerizable material and the additives, completely enclosed in a translucent web, through an activating area of actinic light of sufficient intensity and for a sufficient length of time to complete the polymerization.

Other objects, advantages and features will appear hereinafter.

The polymerizable materials that may be employed to provide continuous sheets of translucent organic plastic material are the ethylenically unsaturated organic compounds which are polymerizable at least in the presence of another such compound, such as styrene. My process is particularly adapted to the polymerization of the alkyl esters of methacrylic acid, such as methylmethacrylate and isobutyl methacrylate and to the ethylenically unsaturated esters of a polycarboxylic acid and a polyhydric alcohol. For example, esters formed from the condensation of such polycarboxylic acids as maleic, fumaric, oxalic, malonic, succinic, glutonic, adipic, pimelic, suberic, phthalic, itaconic, and citraconic, and such polyhydric alcohols as ethylene glycol, propylene glycol, glycerol, pinacol, erithritol, arabitol, manitol, and allyl alcohol. An acyloin and an organic peroxide are added as catalysts. Any acyloin of the formula R—CO—CHOH—$R^1$ where R and $R^1$ are either alkyl or aromatic monovalent hydrocarbon radicals may be used. Common acyloins of this type are acetoin, propioin, butryoin, benzoin, and toluoin. Although any organic peroxide may be used with an acyloin to assist in the polymerization, I prefer to use either lauroyl peroxide, benzoyl peroxide, cumene hydroperoxide, methylethylketone peroxide or tertiarybutyl hydroperoxide.

The carrying web by which the polymerizable material is transported through the activating medium must be translucent to permit the transmission of the activating light. The carrying web for continuous laminates is generally best when it is most transparent since the greater the transparency, the more the actinic light can penetrate through the web to induce polymerization. Cellophane and polyvinyl alcohol film are generally highly satisfactory. However, certain translucent carrying webs, such as silicone treated papers, diaphanes and vellums may also be used and may have an advantage in the dull finish they impart to the laminated material. Untreated nonporous paper may be used as a continuous web and may become an integral part of the finished laminate.

Figure 1:
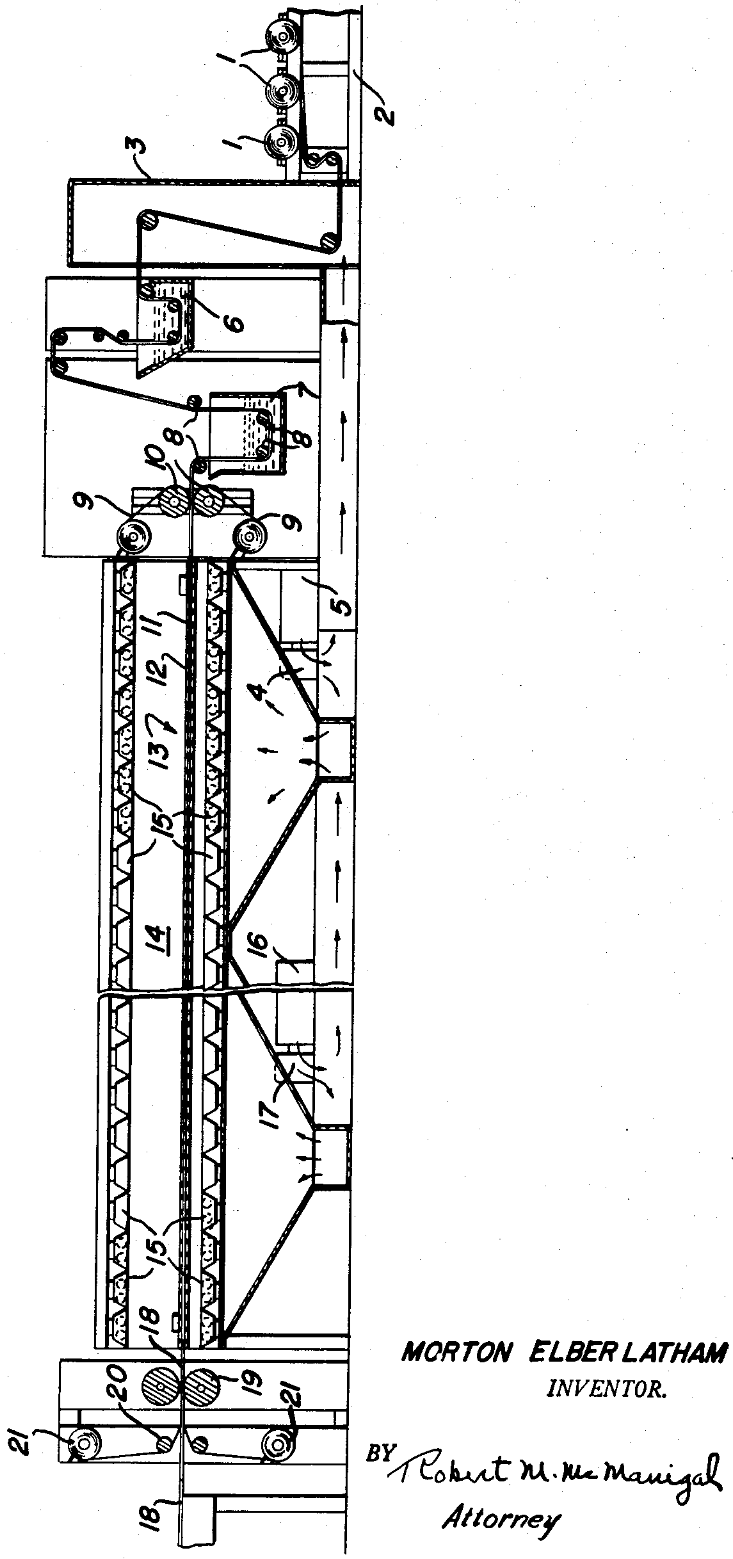
Fig. 1 is an elevational view of apparatus adapted to be used in the process of my invention in making continuous sheets of laminates.

Rolls of filler material 1, supported on a framework 2, are fed continuously through a preheating or drying oven 3. The oven is heated by an air blast driven by blower 4 from heater 5. The filler material is led from the preheating oven through impregnating tanks 6 and 7 controlled by guide rollers 8 and is finally led with carrier sheets 9 through the metering rolls 10. Normally, single plies of filler material are required to pass through but one impregnating vat. At this point the uncured laminate 11 between the web of carrier sheets 9 is held by grips 12, making up a continuous track 13 of grips and led down a tunnel 14 in which polymerization is induced by ultraviolet irradiation from lights 15. The temperature during the polymerization is maintained by the heater units 5 and 16 and blowers 4 and 17. Emerging from the curing tunnel the combined web and cured laminate 18 is driven by the guide rolls 19. The two web faces are stripped by stripper rolls 20. The used carrier sheets are re-rolled on re-rolls 21. The cured laminate 18 may pass on to a shear (not shown) where it may be cut to desired size.

Figure 3:
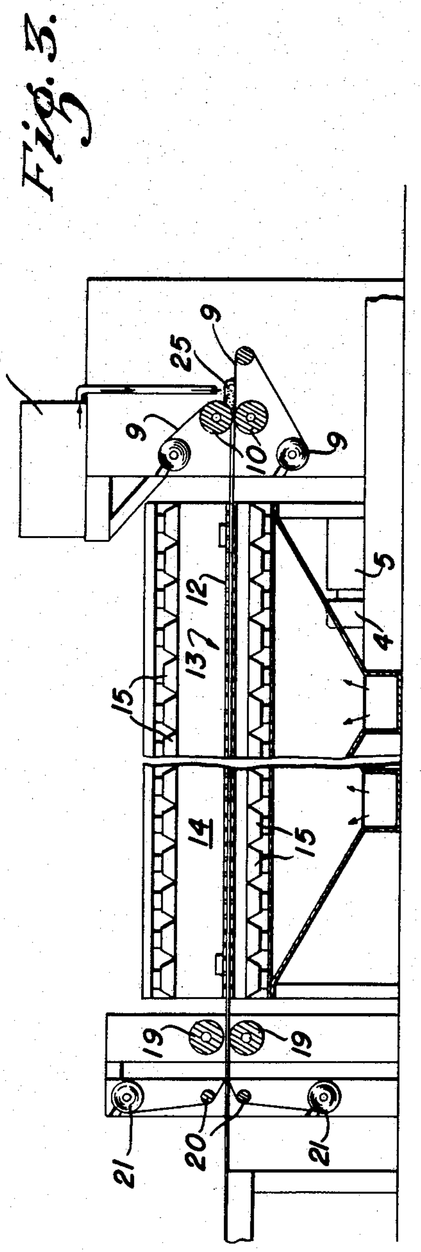
Fig. 3 is an elevational view of apparatus adapted to be used in making continuous cast sheets.

As shown in Fig. 3, in which the parts broken away are similar to those shown in Fig. 1, in making cast sheets monomeric plastic material 25 from the tank 26 is fed onto the lower carrier sheet 9, just before the carrier sheets 9 pass between the metering rolls 10. The polymerization proceeds in the same manner as described in connection with the process for making continuous laminates.

Examples 1, 2 and 3 are examples of my invention for producing continuous cast sheets in which apparatus shown in Fig. 3 may be used.

*Example 1*

200 pounds of methylmethacrylate monomer were heated with one-tenth pound of benzoyl peroxide to thicken the lot to a viscosity of 6 poises, after which the lot was cooled to ambient temperature. Benzoyl peroxide and heat were used to speed and control the thickening or syruping operation. Syruping is desirable to effect greater control over the monomeric material during the continuous casting operation. As the syrup is metered to a definite caliper, relatively high viscosity will assist in maintaining even caliper over the entire width of the continuously cast sheet.

One pound of benzoin and one-half pound of lauroyl peroxide were dissolved in this thickened methylmethacrylate monomer. This mixture was passed continuously on the lower sheet 9 of a cellophane web and covered with a cellophane top sheet 9 to complete the web. The web serves to eliminate air and oxygen contact, both of which tend to inhibit the polymerization, and to provide an enclosure in which the desired thickness may be maintained. The web also serves as the transparent moving enclosure to carry the monomeric polymerizable material continuously through the polymerizing tunnel 14.

Immediately after closure on the monomeric polymerizable plastic material, the carrying sheets 9 are led through metering rolls 10 to control or meter the thickness of the material to be cast. In this case the metering rolls were adjusted with .065" clearance between them to allow .065" of material to pass between them, including the web consisting of two sheets of cellophane 9. The web with its monomeric film passed directly from the metering rolls to the tunnel 14 which was approximately 60 feet in length. In the tunnel ultraviolet light sources 15 were evenly spaced both above and below the carrying sheets 9, for sufficient actinic light to produce substantial polymerization. In this installation 170 General Electric Company 360BL 40 watt ultraviolet light sources were used. These units each had approximately 8 watts of output between 2500 and 4500 Angstroms. The temperature of the web and its enclosed film was controlled from the bottom only by heaters 5 and 16 and blowers 4 and 17.

The reaction in which additive polymers are formed is normally preceded by an induction period in which the reaction does not noticeably progress. This is followed by an increasing rate of polymerization, the rate of which is further increased by the energy released within the reaction products as exothermic heat. The length of the induction period as well as the rate of polymerization is proportional to both temperature and the intensity of the ultraviolet light. For this reason, the temperature immediately following the metering rolls was held relatively high at 165° F. to reduce the induction period in so far as possible. As the web progressed to the middle of the tunnel 14 it was cooled to 100° F. to remove the heat being generated by the polymerization reaction taking place. After the web had advanced to three-fourths through the tunnel the temperature was again raised to 150° F. to insure complete polymerization since the cast sheet being polymerized in the web was not of sufficient thickness or mass to maintain its own heat throughout its travel period through the tunnel.

Time in the curing tunnel was thirty-five minutes. As the material emerged from the curing tunnel the cellophane was stripped from both sides, the hard brittle polymer was rolled in twenty-five foot lengths and sheared off. This material was transparent, averaged .062" in thickness, and was trimmed to 42" wide.

*Example 2*

40 pounds of low molecular weight polymethylmethacrylate were dissolved in 100 pounds of methylmethacrylate monomer. To this was added 15.5 pounds of dibutylphthalate. To this mixture was added 1 pound of benzoin and one-half pound of lauroyl peroxide. The mix was stirred to complete solution, the viscosity of which was 6 poises. This prepared mixture was poured continuously on the lower sheet of the cellophane web and treated in the same manner as set forth in connection with Example 1. This continuous cast sheet emerged from the end of the polymerization tunnel as a continuous sheet of plasticized polymethylmethacrylate .062" thick, slightly less rigid than the material in Example 1.

*Example 3*

One pound of benzoin and threee-fourths pound of lauroyl peroxide were dispersed in fifteen pounds of monomeric styrene. This mixture was dissolved in 200 pounds of a commercial polyester to give a solution of viscosity 6.5 poises. This mixture was poured in a continuous stream on the continuously moving lower web of cellophane and treated in the same manner as set forth in connection with Example 1. Metering rolls in this case were set at .043" which included the thickness of both sheets of the cellophane web.

This material progressed through the polymerizing tunnel in twenty-five minutes with the tunnel held at an even temperature of 170° F. At the end of the polymerizing tunnel the continuous cast copolymer was stripped of the cellophane web and rolled in twenty-five foot lengths, the material averaging .040" thick.

The continuous casting operation for ethylenically unsaturated monomeric materials is most satisfactory when the viscosity of the polymerizable material is between 4 and 9 poises. The viscosity must be great enough to resist undue flow in the polymerizing tunnel and thereby assist in maintaining even caliper across the width of the web. After compounding, the polymerizable syrup must be allowed to lose its entrapped air and as it is poured on the lower sheet of the web, air entrapment should be avoided. Viscosity of greater than 9 poises tends to prevent complete loss of entrapped air, leaving the cast sheet with voids and bubbles. The ethylenically unsaturated polymerizable monomer should contain between one-twentieth and one one per cent acyloin and between one-twentieth and one per cent organic peroxide as optimum quatities of catalytic agents.

Figure 2:
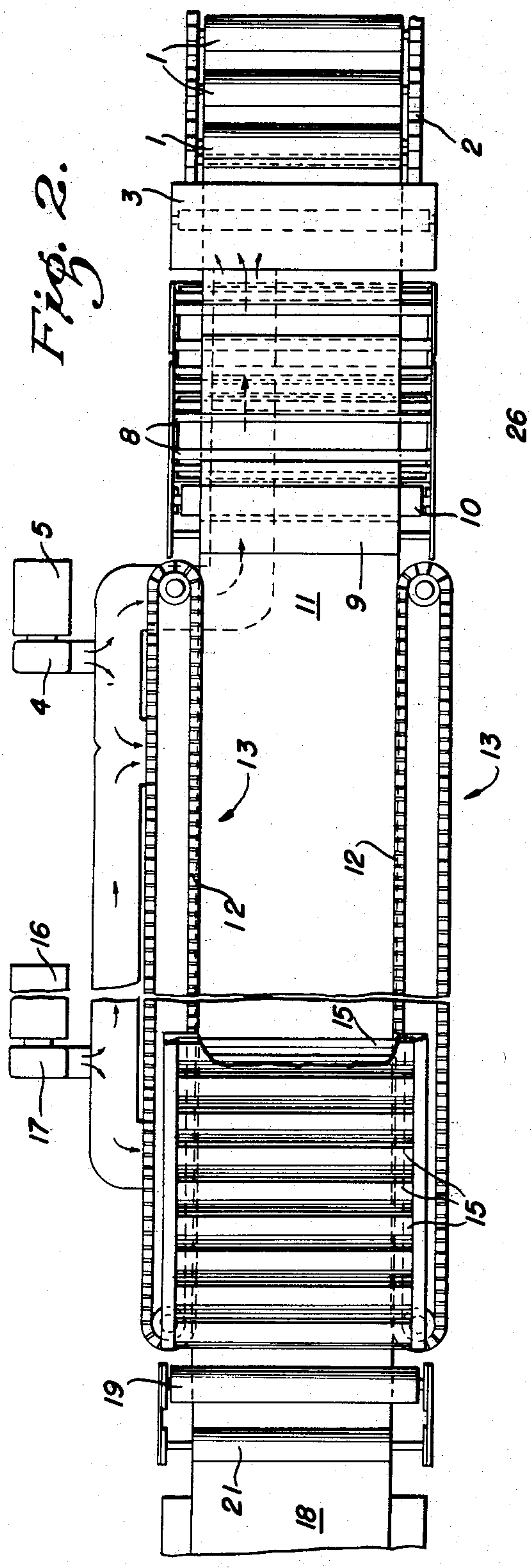
Fig. 2 is a plan view of the apparatus shown in Fig. 1.

Examples 4, 5, 6, 7, 8, and 9 are examples of my invention for producing continuous sheets of laminates in which the form of apparatus shown in Figs. 1 and 2, or a modification thereof may be used.

*Example 4*

To 100 pounds of commercially available polyester was added one-half pound of benzoin and one-half pound of lauroyl peroxide, after which the mix was stirred to complete solution, the viscosity of which was 3 poises. This mix was poured into an impregnation tank 7 located immediately ahead of the metering roll 10. Through this mix a single ply of fine weave glass cloth 1 was fed continuously, thence, between the top and bottom sheets 9 of a cellophane web, then between metering rolls 10 set .008" clearance. From the metering rolls 10 the web, with its green laminate, was drawn through the polymerizing tunnel 14 as described in Example 1. Temperature throughout the tunnel was held at 185° F. and time in the tunnel was fifteen minutes. As the cured laminate emerged from the tunnel it was cellophane stripped and rolled in 100 yard rolls. The laminate averaged .006" in thickness across the width of the web.

*Example 5*

20 pounds of polymethylmethacrylate were dissolved in 180 pounds of methylmethacrylate monomer. To this was added one-half pound benzoin and one-half pound benzoyl peroxide. The mix was stirred to complete solution of viscosity 5 poises. This mix was then put into impregnation tanks 6, 7 ahead of the metering rolls 10. Through tank 7 were drawn continuously two layers of glass cloth 1, and continuously and concurrently one face layer of decorative printed cotton cloth 1 was drawn through tank 6. These completely wetted and impregnated materials were then concurrently led into a polyvinyl alcohol film web and passed through metering rolls 10 set at .065" clearance from whence it was led into the polymerizing tunnel 14 as described in Example 1.

The temperature at the fore end of the tunnel 14 was maintained at 150° F., at its center it was dropped to 100° F. and at the aft end the temperature was dropped to 85° F. Time to travel through the tunnel was forty-five minutes. On emerging from the tunnel the rigid cured laminate was cut in eight foot lengths. The average thickness of the laminate across the web was .06".

*Example 6*

1 pound of benzoyl peroxide and 1 pound of benzoin were dispersed in 5 pounds of monomeric styrene. This mixture was stirred into 200 pounds of commercial polyester, and stirring continued to complete solution. The viscosity of the final mix was 12 poises. 100 pounds of this solution was put in an impregnation vat 7 immediately ahead of the metering rolls 10. To the remainder of this solution was added 25 pounds of monomeric styrene in which one-eighth pound of benzoin and one-eighth pound of benzoyl peroxide was dissolved and the lot stirred to complete solution to give a mix of 1 poise viscosity. This lot was put in an impregnation vat 6 just outside the preheat oven 3. Two plies of fifteen-mill saturating paper were drawn continuously through the preheat oven, thence through the one poise viscosity impregnating tank 6, then through the 12 poise viscosity impregnating tank 7, and thence into a cellophane web 9. After entering the web the combined green laminate was drawn through metering rolls 10 set at .038" clearance and thence through the polymerizing tunnel as in Example 1. The temperature in the polymerizing tunnel was maintained at 200° F. in the fore end, 175° F. at the center and 225° F. the last quarter of the tunnel. Time to progress through the tunnel was twenty-two minutes. On emerging from the polymerizing tunnel the rigid cured laminate was stripped of cellophane and cut to six foot sheets averaging .035" thick across the width of the web.

*Example 7*

1 pound of benzoin and 1 pound of lauroyl peroxide were dispersed in 50 pounds of monomeric isobutylmethacrylate and this was added to 200 pounds of commercial polyester and stirred to complete solution. Viscosity of this mixture was 6 poises. This material was placed in impregnating vats 6, 7 ahead of the metering rolls 10. Three plies of glass cloth 1 were drawn concurrently and continuously through a preheat oven 3, thence through the impregnating vats 6, 7, and the completely wetted and impregnated cloth was drawn thence into a cellophane web 9. The web 9 enclosing the green laminate was then drawn through metering rolls 10 set at .063" clearance and thence into the polymerizing tunnel as described in Example 1. The polymerizing tunnel was maintained at 180° F. at the fore end and 150° F. at the center and 150° F. at the last quarter. Time to progress through the polymerizing tunnel was twelve minutes. As the material emerged from the polymerizing tunnel it was stripped of the cellophane web and cut into eight foot sheets averaging .060" thick across the width of the web.

*Example 8*

1 pound of benzoin and 1 pound of cumene hydroperoxide were dispersed in 10 pounds of monomeric styrene and this was added to 200 pounds of a commercial polyester. To this was added sufficient light stable blue dye to tint and the lot was stirred to complete solution, giving a final viscosity of 4.5 poises. This mixture was placed in impregnating tanks 6, 7 ahead of the metering rolls 10. Three plies of glass cloth were continuously and concurrently drawn through the preheat oven, thence through the impregnating vats 6, 7 and the completely wetted and impregnated filler was drawn into a cellophane web. The web enclosing the unpolymerized laminate was then drawn through metering rolls 10 set at .060" clearance and was then drawn continuously through the polymerizing tunnel as in Example 1. The tunnel in this case was maintained at a temperature of 200° F. throughout its entire length and the period of travel through the tunnel was eighteen minutes. At the end of the polymerizing tunnel the cellophane web was stripped from the rigid laminate to leave a blue-tinted laminate .056" thick which was cut into twenty foot lengths.

*Example 9*

40 pounds of low molecular weight polymethylmethacrylate was dissolved in 200 pounds of monomeric methylmethacrylate. To this was added 1 pound of benzoin and 1 pound of lauroyl peroxide, and the lot was stirred to complete solution. The viscosity of this mixture was six poises. The mixture was placed in impregnating vats 6 and 7 ahead of the metering rolls 10. One ply of fiberglas mat and two plies of glass cloth were drawn continuously through the impregnating tanks. The completely wetted and impregnated filler was then drawn between the cellophane web and thence into the metering rolls set at .040" clearance. From here the web enclosing its green laminate was led through the polymerizing tunnel over a period of twenty-five minutes. The temperature within the tunnel was controlled in the first section at 150° F., in the center section at 120° F., and in the final section at 120° F. On emerging from the polymerizing tunnel the cured laminate was stripped and cut into four-foot sheets average .037" thick across the width of the web.

The continuous laminating operation in which ethylenically unsaturated monomeric materials are used as a binder and polymerization is induced by actinic light should operate with an initial organic monomer viscosity between one half and 20 poises. This rather wide range is necessary due to the extremely wide range of interstice area in the fillers involved. Thus a relatively thin or low viscosity monomeric material must be used to completely wet and impregnate a paper filler; whereas a loosely matted material may require very viscous syrup to prevent run-off. Viscosities which are too low for the filler used will permit air runs and voids. Viscosities which are too high for the filler involved will not wet the filler properly and will leave an improperly wetted and impregnated filler material as well as carry undue air voids into the laminate.

Optimum quantities of catalyst for the ethylenically unsaturated organic monomeric material will be between one-twentieth and one per cent acyloin and one-twentieth to one per cent organic peroxide.

Laminates prepared by this method of polymerization show distinct advantages over normal pyrocatalyzed laminates, in that no surface porosity occurs. Laminates cured in this method are completely non-porous, and have little or no tendency to show an erratic wrinkling or orange-peel at a resin-heavy surface, since the polymerization originates from the surface.

In both the specification and in the claims I have used the term "green laminate" as it is used in the art, that is, to mean unpolymerized laminate.

From the foregoing description, the uses, advantages, and operation of my invention will be readily understood by those skilled in the art to which the invention appertains. While I have described certain examples of the process of my invention, I desire to have it understood that the examples given are merely illustrative and that the invention is not to be limited to the details disclosed herein, but is to be accorded the full scope of the appended claims.

I claim:

1. A process for preparing continuous plastic sheeting which comprises preparing a flowable, polymerizable system containing ethylenically unsaturated monomeric material, an acyloin of the formula R—CO—CHOH—R', wherein R and R' are monovalent hydrocarbon radicals, and an organic peroxide; continuously encasing said system within a continuous flexible, translucent web, and continuously passing said web and system encased therein through an area of ultra-violet irradiation to effect polymerization of the system.

2. A process according to claim 1 in which the monomeric material comprises an alkyl ester of methacrylic acid.

3. A process according to claim 1 in which the monomeric material comprises styrene-polyester.

4. A process according to claim 1 in which the web is selected from the group consisting of cellophane and polyvinyl alcohol.

5. A process for preparing continuous plastic sheeting which comprises preparing a flowable, polymerizable system containing ethylenically unsaturated monomeric material, an acyloin of the formula R—CO—CHOH—R', wherein R and R' are monovalent hydrocarbon radicals, and an organic peroxide, said system having a viscosity of from about 4 to about 9 poises; continuously introducing the system between two continuous sheets of flexible translucent material, continuously passing the sheets and the system therebetween through metering rolls to produce a film of uniform thickness between the sheets and continuously passing the sheet-enclosed film through an elongated zone wherein the film is subjected to ultra-violet irradiation to effect polymerization of the system.

6. A process for preparing a continuous laminate in sheet form having at least one layer of a continuous filler impregnated with polymeric material which comprises preparing a flowable, polymerizable system containing ethylenically unsaturated monomeric material, an acyloin of the formula R—CO—CHOH—R', wherein R and R' are monovalent hydrocarbon radicals and an organic peroxide, continuously wetting and impregnating the continuous filler with the polymerizable system, continuously encasing the impregnated filler within a continuous flexible, translucent web and continuously passing the web-encased, impregnated filler through an area of ultra-violet irradiation to effect polymerization of the system.

7. A process according to claim 6 in which the monomeric material comprises an alkyl ester of methacrylic acid.

8. A process according to claim 6 in which the monomeric material comprises styrene-polyester.

9. A process according to claim 6 in which the continuous filler is woven material.

10. A process according to claim 6 in which the acyloin is benzoin.

11. A process for preparing a continuous laminate in sheet form having at least one layer of a continuous filler impregnated with polymeric material, which comprises preparing a flowable, polymerizable system containing methyl methacrylate, from about 0.5 to 1% of benzoin and from about 0.5 to 1% of an organic peroxide, continuously wetting and impregnating the continuous filler with the polymerizable system, continuously introducing the continuous impregnated filler between two continuous sheets of flexible translucent material, continuously passing the sheets and the uncured laminate therebetween through metering rolls to produce an uncured laminate of uniform thickness, and continuously passing the sheet-enclosed impregnated filler through an elongated zone wherein the film is subjected to ultra-violet irradiation to effect polymerization of the system.

12. A process according to claim 6 in which the continuous filler is paper.

References Cited in the file of this patent

UNITED STATES PATENTS 2,367,661 Agre ------------------ Jan. 23, 1945